July 15, 1969  KOJI TAKATA  3,455,417
DISC BRAKES HAVING AUTOMATIC GAP ADJUSTING MEANS
Filed Sept. 27, 1967  3 Sheets-Sheet 1

United States Patent Office 3,455,417
Patented July 15, 1969

3,455,417
DISC BRAKES HAVING AUTOMATIC GAP ADJUSTING MEANS
Koji Takata, Amagasaki-shi, Japan, assignor to Sumitomo Electric Industries, Ltd., Osaka, Japan
Filed Sept. 27, 1967, Ser. No. 670,834
Claims priority, application Japan, Oct. 1, 1966, 41/64,879
Int. Cl. F16d 55/00, 11/00, 13/60
U.S. Cl. 188—73    11 Claims

ABSTRACT OF THE DISCLOSURE

A disk brake comprising means for automatically restoring the gap between the revolving disc and at least one of the friction members placed on the both sides of the disc, and means for automatically adjusting the gaps between the disc and the friction members in response to the wear of the latter.

---

The present invention relates to a disc brake device of such a construction that a friction member is provided on each of both sides of a revolving disc, an operating device is provided on one side of the disc, the friction member on the side where the operating device is located is pressed against the disc directly by the operating device and the friction member on the side lacking the operating device is pushed by means of a movable member which extends over the circumference of the disc.

In the case of a disc brake of the above-described construction, the movable member must be so guided that it can make parallel shifting or a revolution around a fixed axis in order to push the friction member on the side lacking the operating device against the face of the disc perpendicularly or almost perpendicularly and also to move following the wear on the friction member. In installing such a guide, the selection of the magnitude of the friction to be given to the guide is always a difficult problem.

If the friction is too great, the friction member may remain pushed by the frictional force of the guide even when the operating force of the brake has been removed, and a braking force of this pushing force multiplied by the friction coefficient of the friction member is in effect. That is to say, even if the operating force of the brake is released, a weak braking force will remain in effect at all times while the car is running. This causes rise in the temperature of the disc, loss in the power to drive the car, quick wear on the friction member, etc. which are the so-called dragging phenomena. On the contrary, if the friction is too little, the mass of the movable member gets subjected to the acceleration due to turning, vibration, etc. of the vehicle and cannot resist the force to shift, so that the gap between the friction member and the disc becomes excessive. As a result of this, when braking next time, the blank running distance of the operating device becomes longer. With an ordinary automobile, the stroke of the brake pedal becomes long.

However, since the guide member is in most cases exposed to the outside, the friction of the guide members frequently varies as a result of the entry of dirt and other foreign matters and of rusting.

The present invention provides a guide member which gives a friction force having an automatic restorative action in order to overcome said difficulty.

Figure 1:
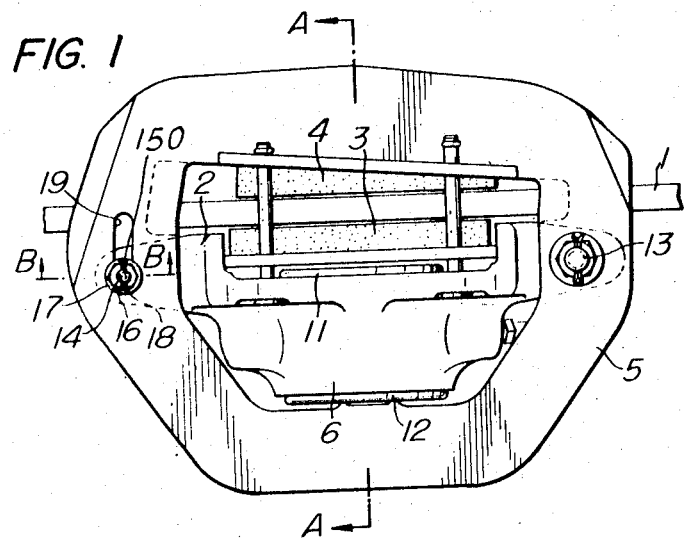
Figure 2:
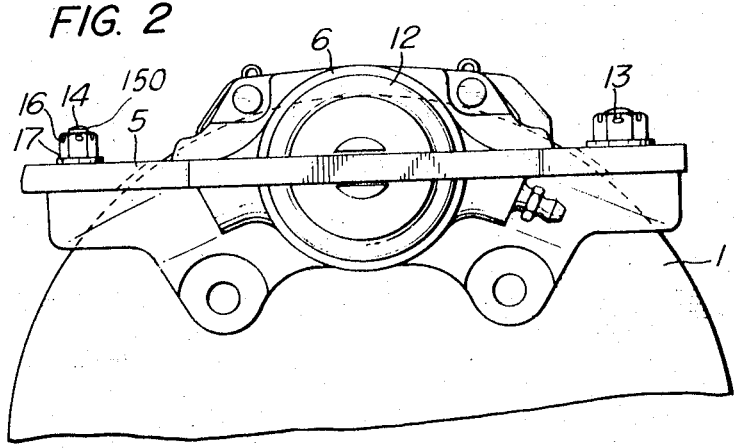
Figure 3:
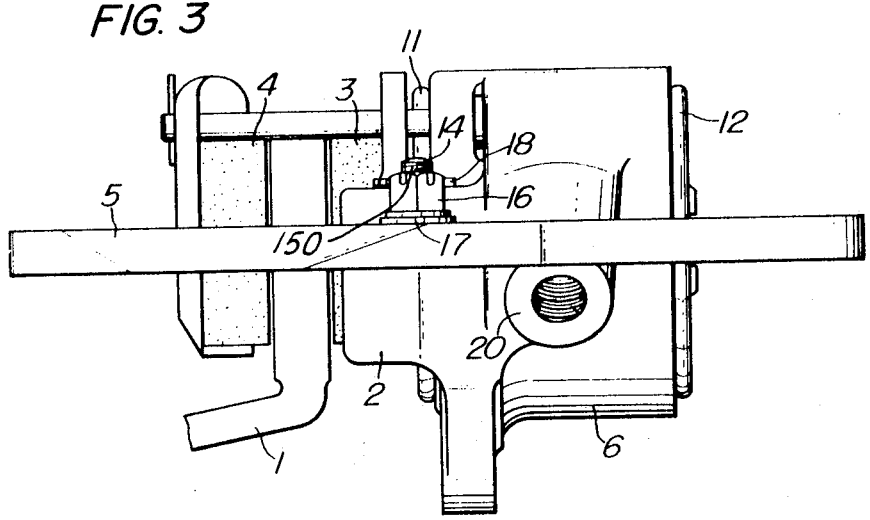
Figure 4:
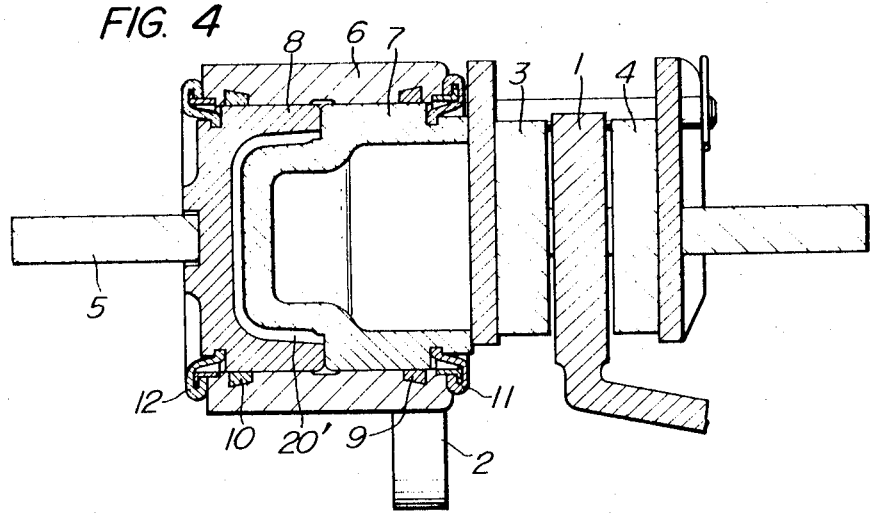
Figure 5:
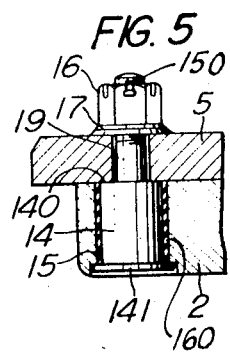
Figure 7:
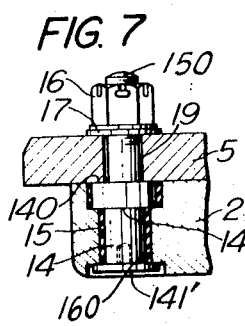
Figure 8:
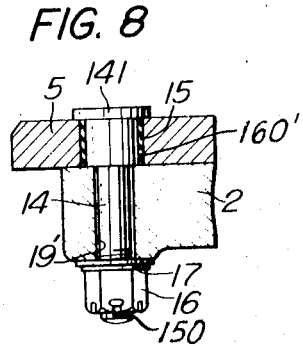
Figure 6:
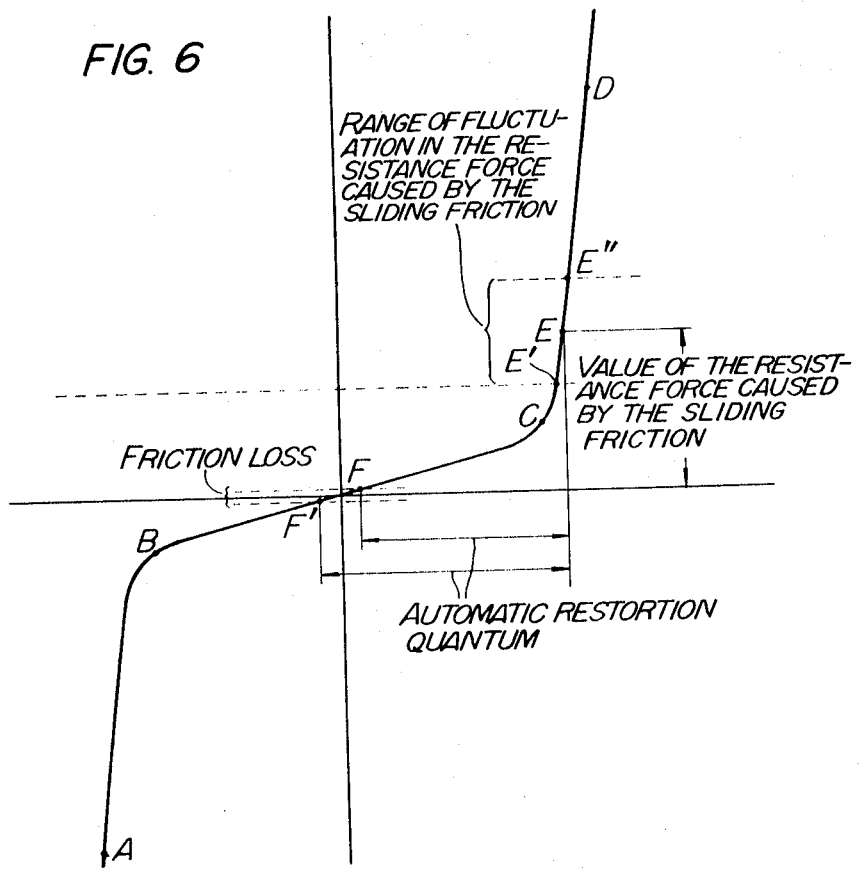

The present invention will now be described with reference to the accompanying drawings of which:

FIGS. 1-4 show a example of a disc brake to which the present application has been applied. FIG. 1 is a top view, FIG. 2 a front elevation, FIG. 3 a side view and FIG. 4 a section along the line A—A of FIG. 1. FIG. 5 is a sectional view to illustrate the essence of the present invention and is a section along the line B—B of FIG. 1. FIG. 6 is a graph showing the properties of an elastic body, and FIG. 7 and FIG. 8 show other embodiments of the present invention.

In FIGS. 1–4, 1 denotes the rotatable disc, 2 the fixed supporting member, 3 the friction shoe moving in the fixed supporting member, 4 the friction shoe provided on the opposite side of the disc, 5 the movable member for pushing the friction shoe 4 into frictional engagement with the disc 1, 7 the piston which is placed in the cylinder 6 provided in the fixed supporting member 2 and which pushes the friction shoe 3 and 8 also the piston to push the movable member 5 and consequently to drive the friction shoe 4. The pistons 7 and 8 are respectively provided with the seals 9, 10 for sealing hydraulic pressure and the seals 11, 12 for preventing the entry of foreign matters from outside and present prime move means for moving member 5 and shoes 3 and 4.

The pivot pin 13 for the purpose of controlling the movement of the movable member 5 is put through the movable member 5 and is attached to the fixed supporting member 2, and the movable member 5 makes a swinging movement about the axis of the pin 13 along an arcuate path to move shoe 4 toward and away from disc 1.

14 denotes an elongated automatic adjustment element in the nature of a pin which extends between members 2 and 5. Pin 14 is tightly received in a hole 160 provided in the fixed member 2 with resilient means in the nature of the elastic body 15, such as shown in FIGS. 5 and 7, interposed therebetween. Pin 14 has a threaded stud portion 150 thereon which goes through an arcuate slot 19 in the movable member 5. Pin 14 also has a flanged portion 141 at the bottom thereof. 16 denotes the slotted nut, 17 the elastic washer, and 18 the split pin. Slot 19 extends along the arcuate path of movement of member 5.

The movable member 5 is frictionally engaged against the annular shoulder 140 located at one end portion of the pin 14 in surrounding relationship to stud portion 150. This is accomplished by tightening the clamp means presented by stud portion 150, the elastic washer 17 and slotted nut 16, so that the movable member 5 and the pin 14 are forced together in such a manner that they do not move if the force does not exceed a definite value of the resistance force caused by the sliding friction but slide when a force exceeding the definite value is applied. That is to say, pin 14 is permitted to move relative to member 5 along slot 19 in response to the application of a predetermined force to thereby automatically adjust the relative positions of the members 2 and 5 when they are in a relaxed condition, whereby to compensate for wear of shoe 4 and the like by maintaining the face of shoe 4 at a predetermined distance from the disc 1 during periods of standby. As the pin goes through slot 19 provided in the movable member 5, the movable member 5 can swing about the axis of the pivot 13.

The elastic body 15 (for example, rubber bush) is manufactured so as to possess such properties as shown in FIG. 6.

In FIG. 6, the abscissa stands for the displacement of the elastic body 15 based on the distortion thereof and the ordinate for the force applied to the elastic body 15.

As to the displacement-force characteristic of the elastic body 15, the body 15 is so manufactured that it has a part B–C where the modulus of elasticity is relatively low and parts A–B, C–D where the modulus of elasticity is relatively high.

E denotes the point corresponding to the resistance force caused by the sliding friction between the element 14 and the movable member 5. If a force exceeding the resistance force corresponding to the point E is applied between the element 14 and the movable member 5, slide takes place between the element 14 and the movable member 5, so that the force applied to the elastic body 15 will not exceed the definite value of resistance force caused by the sliding friction and the displacement of the elastic body 15 will not go beyond the point E. If the value of the resistance force caused by the sliding friction has changed, the point E shifts as shown by E' or E". The modulus of elasticity in these parts is made high enough, so that the displacement of the elastic body 15 corresponding to E', E" is scarcely different from the displacement corresponding to E.

Furthermore, the value of the resistance force caused by the sliding friction is set larger than the force applied to the movable member 5 as a result of the vibration, turning, etc. of the vehicle (not shown), so that the movable 5 can be fully controlled by a force corresponding to E'. Manifestly, body 15 connects the element 14 to member 2 for limited movement relative thereto in a direction along the arcuate path of travel of member 5. Body 15 is operable to yield and thereby permit movement of element 14 relative to member 2 along said path without transmitting a significant force to element 14, at least until element 14 has moved a predetermined distance relative to member 2. Thereafter, body 15 will become relatively unyielding (that is to say, fully compressed), to substantially preclude further movement of element 14 relative to member 2. Thus, a force equal to or greater than the predetermined force is transmitted to element 14 to shift the latter along said path relative to member 5.

When the operating force for braking is released, the movable member 5 is drawn back by the elastic body 15 because it receives a force corresponding to E from the elastic body 15 and is automatically restored to the point where it corresponds to the frictional force F between the movable member 5 and the fixed member. That is to say, the automatic restoration quantum is the displacement quantum corresponding to E-F, and this movement automatically adjusts the gap between the friction member 4 and the disc 1. That is to say, body 15 normally urges element 14 and thereby member 5 and shoe 4 away from disc 1 when body 15 is in its yielded condition.

Even if the movable member 5 is moved by vibration or the like, it automatically returns to F or F', depending on the direction of the application of the force, when the external force has been removed.

The tightening of the movable member 5 with the slotted nut 16 with the elastic washer 17 in-between is advantageous for obtaining a proper tightening force, absorbing errors in the thickness of the movable member 5 and the free thickness of the elastic washer 17.

As can easily be seen from the foregoing explanation of the construction, the condition of operation of this embodiment is as follows: The pistons 7, 8 are driven by the hydraulic pressure of the liquid introduced through an inlet 20 and a passage 20' for the liquid under pressure, the piston 7 pushes the friction shoe 3 and the piston 8 pushes the other friction shoe 4 via the movable member 5. The reaction force to the braking torque is transmitted to the fixed member 2, directly from the friction member 3 and also via the movable member 5 and pivot pin 13 from the other friction member 4.

When the movable member 5 is moved by the piston 8, first the movable member 5 and the pin 14 move as an integral body as they are in frictional engagement by the resistance force caused by the sliding friction between the contact surfaces shoulder 140 and of the elastic washer 17 clamped by the nut 16 and the movable member 5 and the movement of the movable member 5 is absorbed as displacement of the elastic body 15. In case the movement of the movable member 5 is great because of wear on the friction material 4 or others, the displacement of the elastic body 15 reaches the point E of FIG. 6. Further movement of the movable member 5 is realized as a slide between the movable member 5 and the pin 14, and the two are stabilized at a new relative position.

If the operating force for braking is released, the friction member 3 can obtain a proper gap from the disc by virtue of the restoration force based on the elastic deformation of the piston seal 9, but the friction member 4 cannot obtain a proper gap from the disc unless the movable member 5 recedes for a proper distance. If the present invention is employed, the movable member 5 recedes for the distance corresponding to E-F by the restoration force of the elastic body 15 as already stated when the operating force is released, so that a proper gap may be obtained between the friction member 4 and the disc 1.

The value of the resistance force caused by the sliding friction is selected so that the force due to the turning, vibration, etc. of the vehicle will not exceed the selected value. Therefore, the movement of the movable member 5 due to vibration etc. is absorbed as deformation of the elastic body 15, the proper position being restored when the external force has been removed.

Other variations of the embodiments of the present invention will be shown below.

FIG. 7 shows an embodiment in which the pin 14 is provided with a step 140' adapted to engage the bottom face of the recess provided in the fixed member 2 in order that it may be easy to bring the top face of the fixed member 2 and the shoulder 140 of the pin in one and the same plane. There is provided in the pin 14 a flanged portion 141' screwed into end face thereof.

FIG. 8 shows an embodiment in which the pin 14 with a flanged portion 141 is attached in a hole 160' in the movable member 5 with the elastic body 15 disposed in-between, and the fixed member 2 and the pin 14 have sliding movement. In this case, an arcuate slot 19' is provided in the fixed member 2.

Besides the construction shown in FIGS. 1–4, the present invention is applicable to various constructions of disc brakes, such as one in which the movable member makes a parallel movement, one in which the operating device is provided on the movable member, one in which the axis of swing of the movable member is about perpendicular to the plane connecting the axis of the wheel shaft and the cylinder axis. (In the embodiment shown in FIGS. 1–4, the axis of revolution is about parallel to this plane, etc.)

What is claimed is:

1. A disc brake comprising a fixed support member, a rotatable disc, friction elements disposed on opposite sides of said disc, actuating means on one side of said disc operatively connected to said friction elements to effect frictional engagement of said elements with the associated surfaces of said disc, a closed loop type movable member extending over the circumference of said disc and operatively connecting said actuating means with the friction element on the remote side of said disc from said actuating means, and a pivot attached to said fixed support member pivotally connecting one end of said movable member with said fixed support member, wherein said disc brake includes pin means connecting the other end of said movable member with said fixed support member, part of said pin means being snugly received in a hole provided in one of said members with an elastic body interposed between said part and the inner wall of said hole, said elastic body functioning to restore braking clearance upon release of the braking force applied by said actuating means, said pin means being clamped at the end thereof remote from said part with a predetermined clamping force with the other of said members while allowing a slide of said pin means relative to said other member in response to a force exceeding said predetermined clamping force.

2. A disc brake assembly comprising:
a rotatable disc;

a fixed supporting member adjacent the disc;

a closed loop type movable member mounted on the support member for movement along a path toward and away from the disc;

a friction shoe disposed on the movable member for engaging the disc when the movable member is moved toward the disc;

prime mover means for moving the movable member toward the disc;

an elongated automatic adjustment element extending between said members;

clamp means frictionally interengaging one end portion of said element and one of said members, said clamp means being operable to permit movement of the element relative to said one member along said path in response to the application of a predetermined force to thereby automatically adjust the relative positions of the members when they are in a relaxed condition whereby to compensate for shoe wear and the like by maintaining the face of said shoe at a predetermined distance from said disc during standby periods; and resilient means connecting the opposite end portion of the element to the other member for limited movement relative thereto along the path, said resilient means being operable to yield and thereby permit movement of the element relative to said other member along said path without transmitting a signficant force to the element until said element has moved a predetermined distance along the path relative to said other member and thereafter to become relatively unyielding to substantially preclude further movement of the element relative to the other member to thereby transmit said predetermined force to the element to shift the latter along the path relative to said one member;

said resilient means normally urging said element and thereby said moveable member away from the disc when the resilient means is in its yielded condition.

3. A disc brake assembly as set forth in claim 2 wherein said one member is the moveable member and said other member is the fixed supporting member.

4. A disc brake assembly as set forth in claim 2 wherein said one member is the fixed supporting member and said other member is said moveable member.

5. A disc brake assembly as set forth in claim 2 wherein is included pivot means interconnecting said members for relative rotation, said path being arcuate.

6. A disc brake assembly as set forth in claim 5 wherein said element is round in cross-sectional configuration presenting an annular shoulder at said one end portion thereof, said clamp means including a nut and a threaded stud extending outwardly of the element from said shoulder with the latter disposed in surrounding relationship to the stud, there being a round hole in said other member receiving the other end portion of the element therein, said hole being larger in diameter than the element, said resilient means comprising a cylindrical elastic body disposed in the hole around the element, there also being an arcuate slot in said one member disposed along the path, said stud extending through the slot with the shoulder of the element abutting the one member adjacent the slot, said nut being threaded onto the stud forcing said shoulder against said one member.

7. A disc brake assembly as set forth in claim 2 wherein said element includes a shoulder at said one end portion, said clamp means including nut and stud means for forcing said shoulder against said one member.

8. A disc brake assembly as set forth in claim 7 wherein said nut and stud means includes a nut and a threaded stud extending outwardly from said one end portion of the element, said shoulder being annular and surrounding the stud, there being a slot in said one member, said stud extending through the slot, said nut being threadably received on the stud on the opposite side of said one member from said shoulder.

9. A disc brake assembly as set forth in claim 2 wherein said resilient means is an elastic body disposed between said other member and said other end portion of the element.

10. A disc brake assembly as set forth in claim 9 wherein an element receiving hole is provided in said other member, said other end portion being received within the hole, said body being disposed within the hole in surrounding relationship to said other end portion.

11. A disc brake assembly as set forth in claim 10 wherein said other end portion is round in cross-sectional configuration, said body being cylindrical.

References Cited

UNITED STATES PATENTS

| 2,533,186 | 12/1950 | Bricker et al. | 188—73 |
| 2,575,578 | 11/1951 | Bricker. | |
| 3,056,472 | 10/1962 | Bessler et al. | 188—196 X |
| 3,199,633 | 8/1965 | Rodway | 188—73 |

GEORGE E. A. HALVOSA, Primary Examiner

U.S. Cl. X.R.

192—111; 188—196